United States Patent [19]
Fulton

[11] Patent Number: 5,545,801
[45] Date of Patent: Aug. 13, 1996

[54] WAND INDUCTOR FOR REMEDIATION OF CONTAMINATED SOIL

[75] Inventor: A. Carl Fulton, Washington, Tex.

[73] Assignee: Bio-Logical Solutions USA, Inc., Houston, Tex.

[21] Appl. No.: 214,473

[22] Filed: Mar. 17, 1994

[51] Int. Cl.⁶ ..................................................... A62D 3/00
[52] U.S. Cl. ...................... 588/249; 175/206; 210/195.1; 210/258; 405/52; 405/128
[58] Field of Search .................... 405/128, 129; 588/249; 175/66, 206; 210/758, 751, 747, 195.1; 134/25.1; 209/11, 156, 173

[56] References Cited

U.S. PATENT DOCUMENTS

| | | | |
|---|---|---|---|
| 2,530,676 | 11/1950 | Berg et al. | 175/66 X |
| 3,693,733 | 9/1972 | Teague | 175/66 |
| 3,777,405 | 12/1973 | Crawford | 175/66 X |
| 4,234,421 | 11/1980 | Dover | 175/66 X |
| 4,435,292 | 3/1984 | Kirk et al. | 210/258 X |
| 4,536,286 | 8/1985 | Nugent | 175/206 X |
| 4,861,482 | 8/1989 | Frankenberger et al. | 210/747 X |
| 5,055,204 | 10/1991 | Bogart | 210/758 |
| 5,090,498 | 2/1992 | Hamill | 175/206 |
| 5,132,025 | 7/1992 | Hays | 166/265 X |
| 5,151,197 | 9/1992 | Smith et al. | 210/258 |
| 5,195,847 | 3/1993 | Guymon | 405/128 |
| 5,215,596 | 6/1993 | Van Slyke | 175/206 X |
| 5,303,786 | 4/1994 | Prestridge et al. | 175/66 |
| 5,310,285 | 5/1994 | Northcott | 588/250 |

OTHER PUBLICATIONS

John A. Glaser, et al., "Engineering Optimization of Slurry Bioreactors for Treating Hazardous Wastes", Jun. 1994, *Symposium on Bioremediation of Hazardous Wastes: Research, Development, and Field Evaluations–Abstracts*, pp. 109–115.

*Primary Examiner*—Dennis L. Taylor
*Attorney, Agent, or Firm*—Michael A. Gollin

[57] ABSTRACT

The invention is a batch process for biotreatment of contaminated soil according to which the material is placed with microbes and water in a vessel such as a roll-off box with aerators. A slurry recirculating system is used every few days at a point of microbial domination to pump material from the water column into the solid phase at high pressure through a wand inductor, whose outlet is directed around the vessel to shear and agitate essentially the entire volume of material. The configuration of the vessel, agitation with the wand inductor and control of other conditions allows cost-effective microbial degradation of hydrocarbons to regulatory standards in soils having large amounts of clay, rocks, and debris.

32 Claims, 5 Drawing Sheets

WAND INDUCTOR FOR REMEDIATION OF CONTAMINATED SOIL

BACKGROUND OF THE INVENTION

1. Field of the Invention

This invention relates to a system for bioremediation of contaminated media. More specifically, the invention relates to a method and apparatus for removing contaminants from soil and sludge using a hydraulic system to stimulate the effectiveness of microbial action.

2. Related Art

Numerous problems are encountered when attempting to remove hydrocarbon based contaminants from natural soils or man-made media utilizing microbes. It is accepted that a water phase treatment system is required to utilize microbes. It is well known throughout many industries that the introduction of hydrocarbon digesting microbes into a water/solids mixture can result in the complete degradation of the hydrocarbon by the microbes. However, the following problems occur in establishing the water/solids or slurry phase mixture:

A. The ratio of solids to water cannot exceed the system's ability to maintain all solids in a smooth homogeneous slurry. It is recognized in the bioremediation industry this ratio is typically about 10% solids, 90% water, and seldom exceeds 30% solids, 70% water.

B. A "slurry-phase mixture" requires continual mixing of the slurry in order to maintain all solids in uniform suspension.

C. A slurry-phase mixture must consist of very small and uniformly sized solid particles. Without this small and uniform size, a homogeneous slurry cannot be maintained. Particles too large will not remain in suspension (they are too heavy). Particles of different size will require different rates of mixing in order to remain in suspension. Hence a slurry-phase mixture requires that all solids be of uniform size and weight.

D. A slurry-phase mixture must not contain debris (concrete, asphalt, wood products, steel, gloves, clothes, plastic, etc.).

E. Not all soils and man-made media can be placed in slurry-phase, e.g., natural and crushed rock, gravel, stone products, oyster shell (whole or crushed), etc. This material is disposed of in a permitted landfill.

F. A slurry-phase mixture is difficult to attain with heavy clay soils. Generally, clay soils are first dried and then ground in order to break the clay bond.

A general method of the prior art that would attempt to address these problems is as follows. In order to treat a contaminated media in a slurry-phase, the media must be cleaned of all debris. Then all particles that cannot be reduced to a uniform size must be removed. After the soil is "cleaned", it must then be crushed or ground to a uniform size. The processed media is then mixed with water. The solid/water mixture is agitated until all solids are in uniform suspension. Agitation is maintained and the microbial treatment process begins.

These methods are very labor and machinery intensive. The costs are quite high. This method also results in the creation of additional contaminated material (all that was removed from the original media) which must be disposed of in a permitted landfill.

There is an additional method sometimes used to break down clay soils and other media. This method can be broadly classified as soil washing. In order to "wash" soil, a high pressure stream of water is directed at the media to be broken down into smaller sizes. If enough high pressure water is used in this process, one can be assured the shearing action of the water will break down the media. Of course, the problem then becomes the same volume of contaminated media (i.e. a cubic yard of clay is still by volume a cubic yard of clay, but in very small particles) plus, a large amount of contaminated water. The water can be decontaminated using several different methods but at high cost factor. Simply stated, such washing creates a problem greater than the original.

SUMMARY OF THE INVENTION

This invention is a process and apparatus that integrates mechanical, chemical, and microbial remediation means. The process and apparatus are capable of removing all targeted contaminants from soil and sludges by stimulating the activity of naturally occurring microbes with a hydraulic pressure system referred to as a wand inductor.

The system of the invention has many advantages. It allows contaminants to be kept on site, and contained. It requires little space and keeps volatiles from escaping. The invention can operate with a slurry having initially greater than 60% suspended solids, 40% liquid. The invention allows for the separation of the solids and water within the treatment vessel, where solids settling out of the liquid is an integral part of the process. Also, according to the invention, the slurry phase is broken into a solids column and a water column, with the water column having a suspended solids ratio of about 0–5%. Consequently no sizing of the solids or removal of debris is required, and a wide range of particle sizes may be treated together.

The invention allows for the treatment of particulate contaminated media, such as soil, in the same condition it was in when excavated and placed in the treatment chamber. Further, the invention allows for the complete breakdown of all types of soil. This allows each particle of the soil to be exposed to the microbial process. The system is therefore particularly useful for remediating clay-packed soils and media containing debris.

The apparatus of the invention includes a vessel for holding a remediation slurry comprising contaminated materials and water; a slurry recirculating system comprising an intake in the slurry, means for pumping material from the intake to an outlet, and means for discharging the material directionally into the slurry through the outlet under pressure; and an air discharge system for controlledly releasing pressurized air into the water column. In one aspect of the invention, the remediation slurry is a saturated solids column covered with a water column, the intake is located in the water column, and the outlet is directed into the solids column. The remediation slurry generally includes microbes, enzymes, nutrients, surfactants, organic acids, and other substances that promote bioremediation of contaminated media.

In convenient embodiments, the vessel is a 20 cubic yard steel roll off box, the intake has a screen of about 3/8 inch mesh, and the outlet is a pipe with diameter about 1/2 inch. The zone of influence of the outlet is preferably about 6 inches out and about 24 inches down. The outlet pressure is preferably from about 85 to about 130 PSI, between about 95 and about 120 PSI, and typically is about 100 PSI.

The method of the invention comprises placing the contaminated media into a vessel; adding water to cover the material and produce a saturated solid phase with an overlying water column; injecting air into the water column to maintain the dissolved oxygen level at about the biological oxygen demand; adding microbes and support products if required; periodically pumping the water by using a suction means to remove material from the water column and a pump to force the material into the solid phase at high pressure; directing the water discharge around the vessel to contact essentially the entire volume of material; and controlling conditions to maximize microbial degradation of the hydrocarbons until they are fully digested.

Preferably, microbes are added, the directed discharge has a pressure great enough to shear particles bound together and washes debris within the vessel, the discharge means is a half inch pipe with a zone of influence at the outlet of about 6 inches at about 24 inches past the mouth of the pipe, and the outlet discharge shears clay particles and cleans particles from debris. The wanding, or pumping is preferably carried out at a time when the microbial bloom is at about a relative maximum and the contaminant concentration of the water column is at about a relative minimum.

The pumping is repeated periodically until essentially no contamination remains in the vessel, preferably every 2 to 6 days. A roughly neutral pH is maintained, and dissolved oxygen is maintained in a range between about 6 and about 8 ppm.

BRIEF DESCRIPTION OF THE DRAWINGS

The invention is better understood by reading the following description with reference to the accompanying figures.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 1:
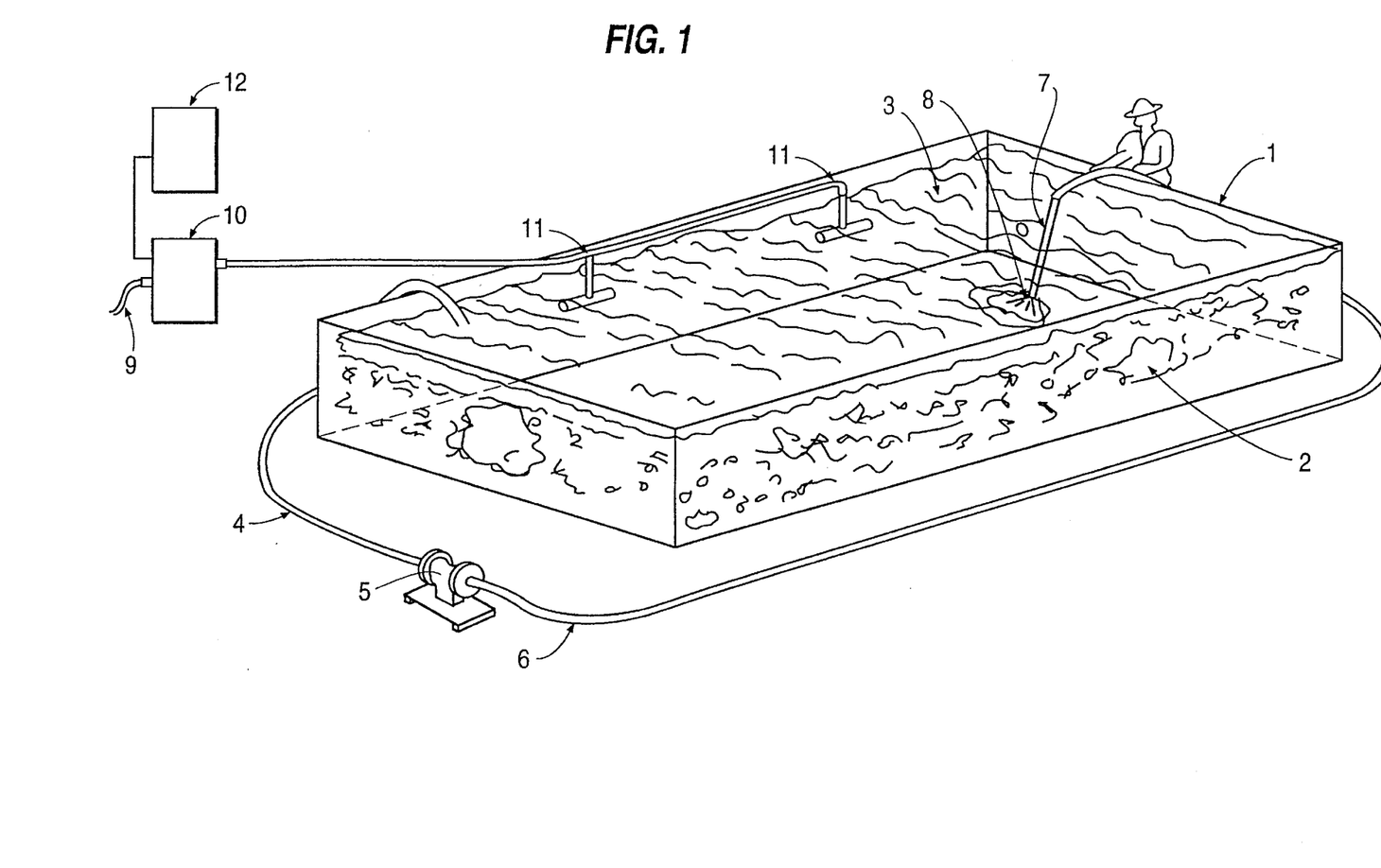
FIG. 1 illustrates the configuration of the wand inductor system in operation.
Figure 2:
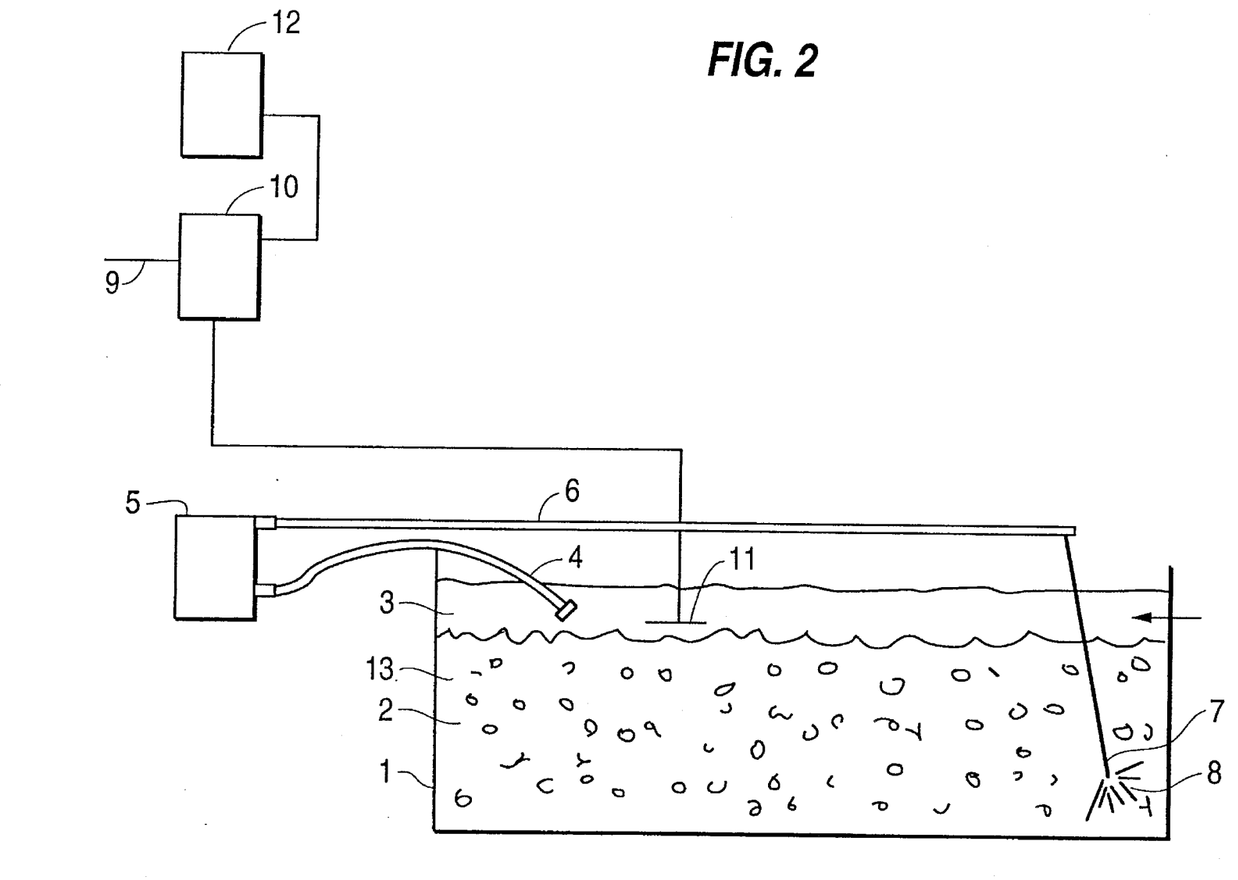
FIG. 2 illustrates a cross section of the wand inductor system.

An embodiment of the invention is shown in FIGS. 1 and 2. This embodiment of the system of the invention is a box system, or slurry reactor. It includes a vessel 1 into which contaminated material 2 can be placed and made into a saturated solids column, or slurry, with water. Water column 3 is above the solid phase. Suction hose 4 is periodically used to remove microbe-activated liquid from the water column 3 and circulate it via pump 5 through discharge hose 6 and wand inductor outlet 7. Suction hose 4 may have a screen, preferably sized to pass ⅜" particles. The outlet is preferably smaller than the discharge hose to provide a discharge 8 at increased pressure. The wand inductor is manipulated and directed up and down throughout the box by a worker so that the zone of influence of the discharge 8 contacts the entire volume of the material in the box.

Air is controlledly routed from air inlet 9 through air distribution control 10 and out an air discharge 11, preferably in the water column 3. If the outlet is in the solids phase it is more easily fouled. The air discharge may be a T-bar aerator, and there may be as many as four or more of them. Master control 12 monitors and adjusts the air flow. The control may be a computer or a pneumatic or mechanical regulator.

Microbes and support chemicals 13 are present in the contaminated media and the water column. They feed on the hydrocarbon and other contamination, nourished by oxygen from the air source and exposed to the contaminants by virtue of the periodic use of the wand inductor.

As can be seen from FIGS. 1 and 2, the inventive process and apparatus integrate three separate technologies to achieve the desired effectiveness—mechanical, chemical and microbial.

1. The mechanical system includes

A. Vessel—An open vessel into which the contaminated media is loaded. The vessel can be of any size or volume so long as it has capacity for the desired amount of contaminated soil or other material, together with water, and accommodates the circulation of air and water as shown in FIG. 1. In a preferred embodiment, the vessel 1 is a box sized for 15 cubic yards of contaminated soil together with water and other components, and the necessary equipment. An example is a standard 20 cubic yard steel roll-off box, having dimensions of 46 inches by 8' by 22'. The vessel can be above ground and moveable or an in ground lined pit.

B. Pump—A pump 5 is required with suction and discharge hoses long enough to extend from the pump position to the farthest corner of the vessel in treatment. Several different designs and styles of pumps can be used in the process. A high pressure double diaphragm pump is preferred. The pump selected is preferably designed to produce a discharge pressure of 100 P.S.I. or greater. This pressure is generally necessary to accomplish the physical treatment of the media with the wand inductor of the invention. Pressures in the range of about 85 to about 130 PSI are preferred, and pressures of about 95 to about 120 PSI have been found to be most effective with clay rich soils.

The pump should also be capable of pumping a mud slurry with rocks and organic matter in suspension. Commercially available pumps such as the 3 inch double diaphragm Model M15 from Wilden Pump Co. satisfy this criterion.

The discharge hose 6 is lined with hydrocarbon resistant material. The discharge device 7 is fitted to the discharge hose. This device is referred to as a wand inductor, or agitator, which is an outlet reducer that will produce a rise in the discharge line back pressure when the pump is operated at a constant volume discharge. The dimensions of the wand inductor are preferably about 0.5 inches in diameter and produce a rise in pressure of about 85%.

Various nozzles may be used provided they produce an effective discharge 8, do not foul or clog and can pass solids that are found in the contaminated media. Effective results are achieved with a length of conventional one half inch galvanized plumbing pipe. In a 20 cubic foot box, a six foot length is adequate. The shearing action of the wand inductor allows for hidden pockets of hydrocarbons to be brought up to the surface of the water column. If two hoses and wand applicators are used by two workers, the manipulation of the slurry is more rapidly accomplished.

In typical applications, the wand inductor is used in a slurry reactor for brief intervals every three days or so. The pump system may therefore be a portable arrangement that is brought to each slurry reactor for periodic treatment.

C. Air System—A means must be provided to inject air into a water column. The volume of air injected into the water must be great enough to raise the level of dissolved oxygen in the water column to maintain Biological Oxygen Demand (BOD) sufficient to support the growth of the microbial population, taking into account the related factor Chemical Oxygen Demand. It is of little importance how the air injection system is designed as long as the necessary BOD is maintained. The air system should be controlled to the extent significant "air stripping" of the contaminant does not occur. This is preferably accomplished by making air flow intermittent so as to maintain an intact water column over each air entry point for the majority of the time. The water acts as a water blanket or water seal. A continuous high air flow would allow for some air stripping which is disfavored or forbidden by environmental regulatory authorities.

Air quality may be checked by continuous monitoring or periodic sampling of the air over the water column. If a closed vessel is used, the air monitoring may be facilitated. In a test of the system with covered boxes used with hazardous waste, no significant air emissions were detected.

Generally, the range for dissolved oxygen in the water column falls between about 6 ppm and about 8 ppm. The air flow system is optimized to provide for a satisfactory microbial bloom without providing excess air which would strip out volatiles. In establishing the proper flow rates, a low flow may be used initially, and then increased until the point where microbial growth is satisfactory and additional aeration does not improve microbial growth.

In a preferred embodiment, the air discharge means is an array of four perforated cylinders 11, each 3 feet long, two on each side of the slurry box and located at the bottom of the water column or deep within it. A master control 12 cycles in 20 second intervals—a solenoid valve is switched open, allowing air to pass to a second valve 10 which connects an air supply 9 with the aerator discharge. The aerators on one side may be operational for 20 seconds, then the air flow is shut off for about 80 seconds, then the air flow is turned on to the aerators on the other side for 20 seconds. This cycle is repeated throughout the treatment period. In a preferred embodiment the air pressure is about 35 PSI at the aerator inlet. The aerator has 5/32 inch holes every 2 inches. A single computer regulates up to 16 boxes. 2. The chemical system may consist of the following components as desired to maintain the effectiveness of the wand inductor system:

A. Surfactants and Stabilizers—Surfactants are used in the process to aid in the mechanical breakdown of tight, clay soils and various forms of media that are bound together. Surfactants are also used to help in the release of hydrocarbons bound to individual particles of the media being treated. Several types and brands of surfactants are available from different suppliers. The products used in this process are preferably organically produced and therefore are more compatible with the microbial system than synthetics and aid in the important functions of co-metabolism within the system. They are also biodegradable to allow for the desired remediation to occur. Any compatible and cost-effective surfactant could be employed, however. Examples are Catalyst RDG 4500 Plus™ and 4570, available from Bio-Logical Solutions U.S.A., Inc.

RDG 4500 Plus™ is most preferred in general. This preparation is an organic emulsifier that helps water enter areas of soil with lipophilic hydrocarbons. It is biodegradable and contains 56% humic acid, 40% organic polymer solution, and 4% of an enzyme solution. A soil penetrant such as fulvic acid may also be desirable. In situations with heavy asphaltines, it may be desirable to use a surfactant such as Bio-Logical Solutions U.S.A., Inc.'s RDG 4570 instead.

The concentration of surfactants is preferably between about 0.5% and about 2.5%, most preferably about 1.5%. A typical application rate for RDG 4500™ is about one gallon/50 cu. yards. If the concentration is too high, undesirable effects may occur, such as foaming and air stripping.

A defoamer that is not injurious to microbes may be used to disperse large bubbles at the surface. A preferred compound is a water base defoamer from Varichem containing a cationic surfactant.

Other compounds may be used to stabilize the slurry, such as PARA-GO™, a product of Bio-Logical Solutions U.S.A., Inc., that facilitates the separation of hydrocarbons from the soil. It contains ammonium sulfate in a hydrocarbon carrier.

B. Microbial System Support Products—There are many products available that promote the health and growth of microbes. The use of these products is not essential to the process in all cases but they contribute to a timely microbial response and may improve performance under certain conditions.

An acidifier should be used to neutralize alkaline soil and to maintain a pH of preferably about 5.5 to 7.0, most preferably about 6.5. A preferred preparation is RDG Series 05 Supracid™ from Bio-Logical Solutions U.S.A., Inc., typically used at about one gallon/100 cu. yards. This acidulant and chelater contains bio-organic acids derived from fermentation, such as formic acid, acetic acid, propionic acid, butyric acid, palmitic acid, and stearic acid. Hydrolyzed proteins and amino acids may also be used. A nontoxic mineral acid such as sulfuric acid may be used to help maintain the pH in a desirable range, but the organic product chelates metals and may help promote their solubilization.

Bio-Logical Solutions U.S.A., Inc.'s RDG Series Poly Extend™ is a preparation of five polymerized organic compounds used typically at about 1 gal./1000 cu. yards to soften clay soils, promote soil flocculation, and protect microorganisms so that they function at higher or lower pH and temperature (by 10 to 15 degrees) than normal.

A high nitrogen, chlorine-free nutrient preparation such as a 20-2-2 N-P-K fertilizer helps the initial microbial bloom. A preferred nutrient source is Bio-Logical Solutions U.S.A., Inc.'s RDG Series Biolates™ 20-2-2, at about 1 gal./40 cu. yards. This preparation contains 2% free and complexed amino acids, 5% bio-organic acids and co-metabolites, 20% nitrogen (5% ammonia, 5% nitrate, 10% complexed), 2% phosphate (as $P_2O_5$), and potassium (as $K_2$).

C. Metals Removal

In applications where substantial metals contamination is present in the media to be treated, such as lead or chromium, it will be beneficial to add compounds to solubilize and extract the metals from the slurry for precipitation and removal. Where the concentration of metals is so high as to be toxic to microbial growth, the slurry may be made slightly acidic to solubilize the metals and bring them into the water column. The metals may be removed from the water column, and the slurry then agitated by use of the wand inductor. Metals may once again be removed from the water column, and the process repeated until acceptable levels of metal are reached. At that point, microbes and support products may be introduced for bioremediation of the hydrocarbons. Where metals levels are lower, but still above regulatory action levels, it may be preferable to solubilize and remove the metals after or during biotreatment of the organic contaminants.

3. The microbial system consists of:

Microbes—For the wand inductor system to work effectively, a mixture of microbes is generally required. Species that are effective in general include *Pseudomonas vesicularis, Pseudomonas aeruginosa, Achromobacter xyloxidans, Achromobacter sp., Areomonas sp.*, and many other strains of hydrocarbon digesting fungi and bacteria. Several suppliers of processed microbes that degrade hydrocarbons distribute their products through a world wide marketing system. Any of these products can be used in the system. Some suppliers' products produce better results than others. The initial proportions are not very important because the populations of the microbial species best adapted to digest the particular contaminants in a treatment box will increase rapidly in the treatment system.

A preferred product is Bio-Logical Solutions U.S.A., Inc.'s RDG 100™, at about 1 lb./5 cu. yd., which contains at least 32 different strains of bacteria selected for an ability to rapidly degrade hydrocarbons. The following species of microorganisms are generally included: *Acinobacter, Cellumonas, Flavobacterium, Arthrobacter, Alcalagines spp., Candida tropicalis, Cunninghamella elegans, Arthrobacter parafinneus, H. salinarium, H. cutirubrum, Propionobacterium, Actinomycetes, Eubacterium, Arachnia, Bacterionema, Rothia, Agromyces, P. vesicularis, P. aeruginosa, Achromobacter xyloxidans, Achromobacter sp., Areomonas sp., Mycobacterium, Norcardia, Micromonospora corynebacterium, C. sporogenes, Bacillus, Gluconobacter, A. Vinelandii,* and *A. chromococcum.*

In applications where there are high concentrations of particular compounds such as phenols, it may be desirable to use a blend having microbes adapted to digestion of such compounds, such as RDG 300™ from Bio-Logical Solutions U.S.A., Inc. Cryptosporidium is especially effective at consuming polycyclic aromatic hydrocarbons and creosote. Other microbes such as Alcalagines strains isolated by General Electric are effective at digesting polychlorinated biphenyls.

Naturally occurring hydrocarbon-digesting indigenous microbes are generally found in contaminated soils and supplement the added microbes. The indigenous microbes can also be utilized without added microbes in the Wand Inductor system, but this is generally less effective at timely degradation of contamination. For example, the microbial degradation process is in actuality primarily an enzymatic process by which enzymes that are secreted from or contained within the bacteria, fungi, and other microbes that are present hydrolyze or break down the petroleum hydrocarbons and other contamination that may be present. The microbial degradation could therefore be emulated or stimulated by adding an enzyme preparation to the slurry at the beginning of the process, and after each wanding, as an adjunct to our substitute for adding microbes.

The process can be carried out at temperatures between about 45° F. to 110° F., preferably in the range of 80° to 110°, and most preferably about 85° F. With stabilizers, degradation can occur at temperatures as low as 40° F. At higher or lower temperatures, the microbes either go dormant or are killed.

Operation of the Wand Inductor System

Figure 3:
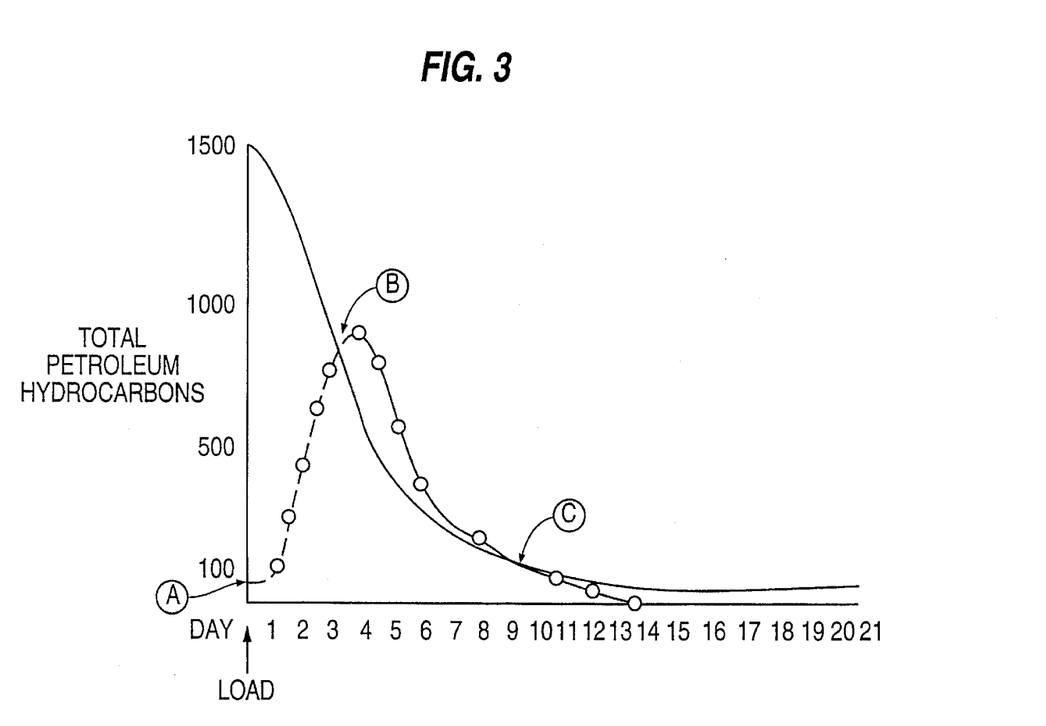
FIG. 3 shows an idealized curve for treatment of hydrocarbons in a bioreactor having a total aqueous state.
Figure 4:
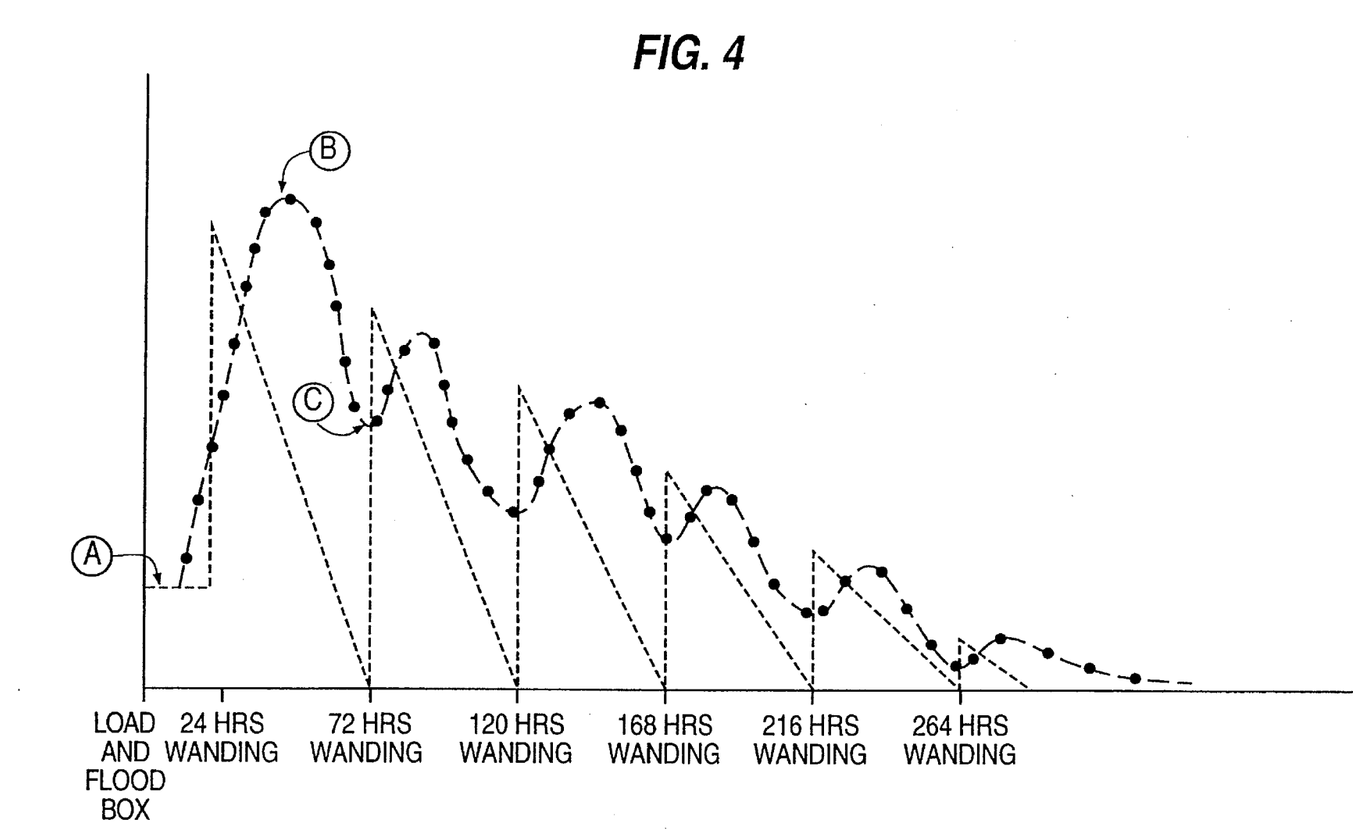
FIG. 4 illustrates the cycles of microbial bloom in a solid-liquid system correlated with use of the wand inductor.

FIGS. 3 and 4 show hypothetical views of the relationship between contaminant level and microbial growth rate and are intended merely to illustrate operative features of the invention, not quantitative results.

FIG. 3 shows an idealized view of a fixed-film bioreactor utilizing a total aqueous state with all contaminants in solution and not attached to any solid. At loading (point A), contaminant levels are at their highest, and microbial growth is at zero. Microbial growth increases until it exceeds the food source and then overcompensates before it begins to decline. This may be referred to as the domination point (B). Thereafter, contaminant levels decrease, as does microbial growth, until the completion point (C) at which there is not enough food to sustain the microbes. This point is generally accepted by state or local regulators as clean.

With contaminated solids, the aforementioned process does not occur. Using the apparatus and method of the invention, however, a similar cycle may be achieved as shown in FIG. 4: a portion of the hydrocarbons are brought into the water column (loading, point A), the microbes grow to domination (B), and the contaminants in the water column are reduced to the completion point (C). The solids are mixed again, to reload the water column with contaminants, so the loading-domination-completion cycle may be repeated. This cycle is repeated until the entire preparation is free of contamination.

A generalized course of treatment is depicted graphically in FIG. 4, which shows a hypothetical curve for a typical 11 day treatment. At the time of loading, the contaminated media is placed in the vessel to a depth preferably of 2 to 6 feet. Contaminants may be any of, e.g., the following: alkylamine oxides, aromatics, polynuclear aromatics, benzene, biphenyl, branched hydrocarbons, carbamate, carbofuran, chromates, crude oil, cyanides, cycloparaffins, diethyleneglycol, halogenated hydrocarbons, hydrocarbons, long-chained alkenes, metalloorganic compounds, metals, monoalkylbenzenes, naphthalene, organic pesticides and herbicides, organophosphates, pentachlorophenol, petroleum phenolics, phenoxyacetates, phenylureas, polycyclic aromatics hydrocarbons (PAH), polychlorinated biphenyls (PCBs), pulp by-products, sodium methyl sulfate, secondary alkylbenzene, sulphur, surfactants, thiocyanates, toluene, and trinitrotoluene (TNT). The contaminated media can be any particulate material capable of forming a slurry from a saturated solids column and a water column, such as soil, clay, sand, vegetation, and mixtures of materials.

The box is flooded with non-chlorinated water until the media is saturated and a satisfactory amount of water, preferably 6 to 12 inches, is covering the media.

An air injection system is installed and air under pressure is released into the water column. The volume of air introduced in the water has to be regulated to assure the dissolved oxygen in the water is always roughly equal to the Biological Oxygen Demand, and may approach 8 ppm or supersaturation. The air pressure is computer regulated to assure that no air stripping of volatile hydrocarbons occurs during the process. Pneumatic or mechanical regulation may be employed instead. The regulator controls the flow of compressed air to the air discharger in an intermittent pattern that provides the required oxygen content, without exceeding it so as to strip out volatiles. A continuous stream of diffused air through a fine bubble diffuser could satisfy this requirement, but the equipment is likely to be costly and easily fouled by mud. The preferred aerator is a T-bar cylinder with holes. The pressure is determined by hydrostatic head at the release point, and air emissions may be monitored.

Microbes and the microbial system support products are then added to the oxygen balanced water column. This provides an initial low level of nutrients, as shown in FIG. 4, at point A. The nutrients stimulate an initial microbial bloom.

A varying period of time, dependent on quantity of material being treated, is allowed for the microbes to dominate the aqueous phase. This may be about 24 hours after flooding. By dominate is meant that the microbes have multiplied to a level where their number exceeds the available food supply (contaminants) or their oxygen demand exceeds the ability of the system to deliver it. At the point of domination (shown as B on FIG. 4), the oily appearance at the surface of the water is replaced by a visible microbial bloom, which is a distinctive bubbly scum. Oily clumps are converted to lighter aerated material by the microbial bloom. The supply of nutrients available in the water column falls off as the microbial bloom peaks and the growth rate declines.

At this point, the box is "wanded" (point C on FIG. 4). The microbe-dominated water column is recirculated back through the solids phase to capture any remaining nutrients, i.e. contaminants. A pump is positioned with the suction hose of the pump in the water column. The pump is then started and it draws in the microbial activated, oxygen balanced water. The water is discharged through a high pressure flexible hose. The outlet of the hose is a wand inductor greatly reduced in size (i.e., 3 inch hose to ½ inch outlet) causing a pressure rise in the hose. The rise in pressure produces a jet of high pressure water that is directed into the contaminated media in the vessel. The shearing action of the water is used to break up all bound together forms of media and to wash debris. The pressure is great enough and the shearing action is strong enough that the hose discharge can be manipulated throughout the contaminated media to break up clumps. One or two workers using one or two wands work through the entire volume of the box, which may take about one to two hours, after which the wand is removed.

The wand inductor may be fixed and directionally adjustable, or it may be mobile to achieve this thorough shearing. The water that is drawn off by the suction of the pump is immediately injected back into the vessel. The same water is reused many times in the "washing" action of the Wand Inductor process. Thus the problem of increasing volumes of process water has been eliminated.

As the water is drawn through the pumping system an ever thickening mud slurry is created. This benefits the process in two ways. First, microbial action is most efficient when a contaminated media is in a slurry phase. This allows maximum contact of the microbes and chemicals with even the smallest particles of the contaminated matrix material. Because of the considerable water forces produced by the process essentially all media in the vessel is placed in slurry at some point during treatment. Not all media is in slurry at the same time. Another benefit derived is the increased shearing action of the thickening slurry.

As the media is reduced in size to the individual particles, all debris is blasted clean and the hydrocarbon contaminants are released into the water phase. Most hydrocarbons are lighter than water and when released will rise through the water phase until they reach the water surface. At this point the hydrocarbons remain in the water column or on the surface of the water column. Either location places the contaminant within the microbial environment; a balanced aqueous phase with the required BOD, COD, and food source (the contaminant).

In the water column, the microbial population and oxygen levels are reduced by the application of the wand inductor, while nutrients are increased and microbes from within the solids column are exposed to the enriched liquid. The concentration of contaminant and hence food source in the water column spikes upward at the time of the first wanding. The rate of microbial growth continues to climb, and the concentration of contaminant drops as the contaminant is digested by the microbes until the contaminant in the water column is mostly eliminated. The decline in contaminant concentration reduces the microbial food source and causes the rate of microbial growth to decrease toward zero.

As shown in the second peak of FIG. 4, the rate of microbial growth increases rapidly, and the microbial colony continues to rebuild within the water column until all released hydrocarbons are biodegraded. By rebuilding is meant that microbial growth quickens, until another bloom occurs at the point where microbial growth begins to exceed available oxygen and nutrients. Once again, the wand applicator is used. The second bloom may take about 36 to about 96 hours, typically about 2–3 days or 3 times a week.

While this rebuilding process is occurring in the water column, additional activity is continuing throughout the media. The water that was pumped through the system was not only used as a washing and shearing agent, it was also used as a carrier of dissolved oxygen and hydrocarbon digesting microbes. This allows the microbes that were driven to the bottom of and throughout the solids phase, including the deepest or most difficult to reach areas of the media to digest all hydrocarbons they are in contact with. The deep injected microbes will continue to degrade hydrocarbons until the dissolved oxygen is depleted or until the food source is exhausted. At either point the microbes will die or become dormant. This facilitates digestion of contaminants throughout the box. The dissolved oxygen falls off in the solids phase, as does microbial growth.

Some microbes require a point of colonization for reproduction and digestion. In fixed-film bioreactors, the plastic substrate provides such a matrix. In slurry phase treatment according to the invention, the solids provide a virtually unlimited surface area available for microbial colonization. The microbes may colonize a solid particle in the oxygen-rich water column, and then as the solids settle, the microbe is brought to the lower portion of the slurry. Eventually such microbes expire for lack of oxygen, but wand treatment of the slurry is understood to increase the amount of oxygen available in the lower portions of the slurry, while increasing the points of colonization. These beneficial processes may be partly responsible for the surprising effectiveness of the invention.

But as the previous microbial bloom is exhausted, the slurry phase begins to separate, due to gravity. The surface water column reverts to the original conditions that allowed for optimal microbial reproduction. After the microbial colony is rebuilt in the aqueous phase, the system has completed one full cycle.

In each successive cycle, the concentration of contaminants is likely lower than in the earlier cycles. The colony in the water will rebuild itself and the microbes injected deep will continue the degradation until oxygen or food is exhausted. If the vigor of the microbial bloom slackens before the desired level of remediation is achieved, the pace of microbial growth may be quickened by adding nutrients, acid, and support products as necessary once again. Water is added to compensate for evaporation.

The word cycle refers to the timing of the mechanical process in conjunction with the microbial bloom. During the cycle, degradation and other biological processes are continuous, although the rates vary. Preferably, the preparation is "wanded" at a point of maximal microbial bloom.

Throughout each cycle the water in the vessel will be contaminated with all agents released by the washing action. This problem is overcome because the system uses the water phase to obtain the greatest rate of microbial colonization. Any and all contaminants found in the water column are consumed by the microbes.

As shown in FIG. 4, the cycle is repeated until all food sources (contaminants) are removed from the media and the desired results are attained. The process yields a clean, non-contaminated media and a minimal volume of cleaned process water at the end of the process. When the desired level of remediation occurs (which can be determined by visible observation of a lack of microbial bloom, and can be confirmed by conventional sample tests), the air source is removed, the microbial population then dies off and the water becomes clear. The aerators are removed, the box is dumped out and the equipment may be reused on site or removed.

The advantageous features of the invention include:

1. The adaptability of the process to any open vessel.
2. The ability of the system to solve many problems through the reuse of a small volume of water.
3. The unique, cost-effective, and simple manner in which water volumes and shear pressure are attained to wash the debris and breakdown the media.
4. The demonstrated ability to maintain the process while allowing a natural settling of solids from the slurry phase.
5. The demonstrated ability to produce the conditions in a vessel that allows the process to rejuvenate itself after each cycle of the system.
6. A controlled air system that maintains a sufficient BOD level for the microbial activity but is not great enough to cause air stripping of the volatiles in the contaminants.
7. The ability of the process to treat all contaminated media and not produce a secondary source (debris, etc.) which must be disposed of in some other manner.

The fundamental cycle used in this invention is a biological process that is not susceptible to exact calculation. The relationship between nutrient and microbe may be other than that shown in FIG. 4, for example. The actual performance characteristics will depend on such factors as the temperature, the type and amount of contaminants, the physical characteristics of the media, the pH, the dissolved oxygen, the presence of additional support products, indigenous microbes, the dimensions of the vessel, and the extent of physical treatment with the wand.

EXAMPLE 1

A refinery in Texas had extensive areas of hydrocarbon-contaminated soil. The soil was clay-rich and heavily contaminated with debris. Conventional 20 cubic yard roll-off boxes constructed of steel were brought to the site. Fifteen cubic yards of soil was placed in each box to a depth of about 2.5 feet, and water was added to about one foot over the soil. T-bar aerators were hung on the side of the box by conventional means. Each box received some or all of the following components available from Bio-Logical Solutions U.S.A., Inc., 214 Addicks-Howell Road, Houston, Tex. 77079.

Microbes: 2 to 5 pounds of RDG 100.

Microbial Protector: 4 to 32 ounces of RDG Series Poly Extend.

Acidifier: 16 to 32 ounces of RDG Series 05 Supracid.

Nutrients: 32–48 ounces of RDG Series Biolates 20-2-2.

Surfactant: 8–16 ounces of RDG 4500 or 4500 Plus.

Up to 5 gallons of Para-Go.

4 ounces of a water base defoamer.

The boxes were treated as follows. The air supply was turned on. About 24 hours thereafter, the microbes dominated the water column, and the box was agitated or "wanded". About three to six days later, there was a second microbial bloom, and the box was wanded again.

After a period ranging from about one to about eight weeks, total petroleum hydrocarbon content (TPH) was reduced in all cases to less than 100 ppm. Table I shows the results for a series of treatments.

As shown in FIG. 4, for soil with a starting TPH range of 300 to 1000 ppm, 17 boxes were treated. Average treatment time was 7.29 days, average starting TPH was 341 ppm, and the average release rate was 13.6 ppm TPH.

Figure 5:
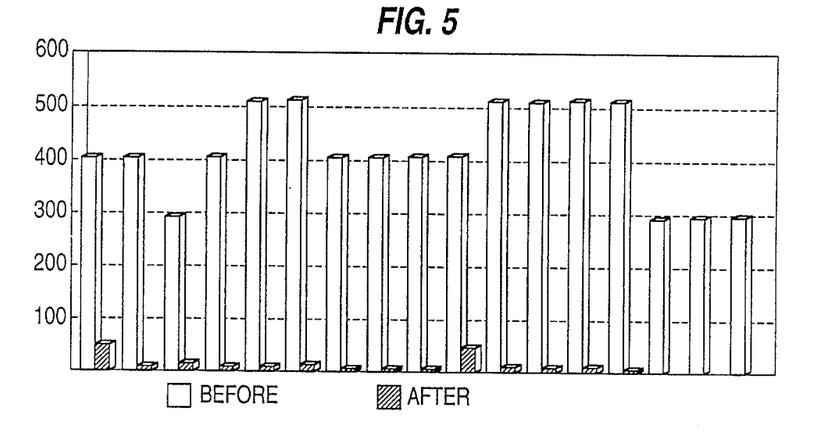
FIG. 5 summarizes treatment results with slightly contaminated soil.

As shown in FIG. 5, for soil with a starting TPH range of 1000 to 5000 ppm, 31 boxes were treated. Average treatment time was 22 days, average starting TPH was 2851 ppm, and the average release rate was 42 ppm TPH.

Figure 6:
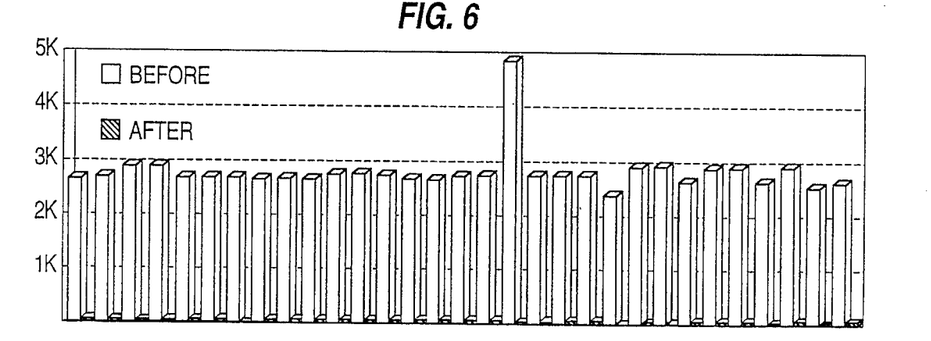
FIG. 6 summarizes treatment results with moderately contaminated soil.
Figure 7:
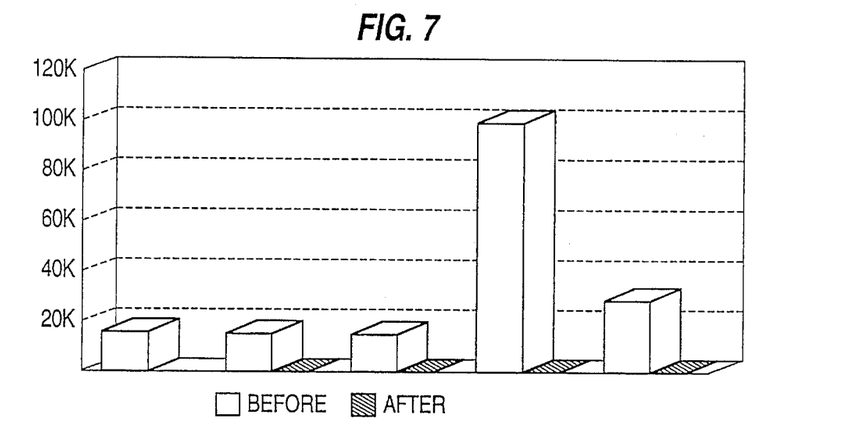
FIG. 7 summarizes results of treatment with severely contaminated soil.

As shown in FIG. 6, for soil with a starting TPH range of over 5000 ppm, 5 boxes were treated. Average treatment time was 44.5 days, average starting TPH was 34,920 ppm, and the average release rate was 61 ppm TPH.

When the TPH is satisfactory, the air, water, and control systems were turned off and the boxes were dumped. The soil was allowed to dry and is used for fill dirt.

TABLE I

| ID Number | Date Received | Date Released | Beginning TPH | Ending TPH |
|---|---|---|---|---|
| F-101 | 3/18/93 | 4/9/93 | 2,700.0 | 55.0 |
| F-102 | 3/18/93 | 4/16/93 | 2,700.0 | 67.3 |
| F-103 | 3/18/93 | 4/13/93 | 3,000.0 | 42.8 |
| F-104 | 3/18/93 | 4/16/93 | 3,000.0 | 44.8 |
| F-105 | 3/18/93 | 4/16/93 | 2,700.0 | 46.1 |
| F-106 | 3/18/93 | 4/16/93 | 2,700.0 | 33.9 |
| F-107 | 3/18/93 | 4/9/93 | 2,700.0 | 4.4 |
| F-108 | 3/18/93 | 4/13/93 | 2,700.0 | 41.4 |
| F-109 | 3/18/93 | 4/9/93 | 2,700.0 | 78.6 |
| F-110 | 3/18/93 | 4/9/93 | 2,700.0 | 12.3 |
| F-111 | 4/5/93 | 5/3/93 | 2,800.0 | 44.1 |
| F-112 | 4/5/93 | 5/28/93 | 2,800.0 | 51.6 |
| F-113 | 4/5/93 | 5/19/93 | 15,200.0 | 35.0 |
| F-115 | 4/5/93 | 6/7/93 | 15,200.0 | 70.0 |
| F-116 | 4/5/93 | 6/7/93 | 15,200.0 | 54.0 |
| F-119 | 4/5/93 | 4/23/93 | 2,800.0 | 17.0 |
| F-121 | 4/15/93 | 4/28/93 | 2,700.0 | 45.0 |
| F-122 | 4/15/93 | 5/21/93 | 100,000.0 | 71.2 |
| F-123 | 4/15/93 | 4/28/93 | 2,700.0 | 30.0 |
| F-124 | 4/16/93 | 5/12/93 | 2,800.0 | 42.7 |
| F-125 | 4/16/93 | 4/26/93 | 2,800.0 | 66.9 |
| F-126 | 4/22/93 | 5/28/93 | 4,900.0 | 20.0 |
| F-129 | 4/26/93 | 5/21/93 | 2,800.0 | 63.3 |
| F-130 | 4/29/93 | 5/9/93 | 413.0 | 56.1 |

TABLE I-continued

| ID Number | Date Received | Date Released | Beginning TPH | Ending TPH |
|---|---|---|---|---|
| F-131 | 5/4/93 | 5/21/93 | 29,000.0 | 74.6 |
| F-132 | 5/4/93 | 5/21/93 | 2,800.0 | 35.7 |
| F-133 | 5/4/93 | 5/21/93 | 2,800.0 | 42.0 |
| F-134 | 5/9/93 | 5/28/93 | 413.0 | 11.2 |
| F-135 | 5/13/93 | 5/28/93 | 2,400.0 | <0.1 |
| F-137 | 5/21/93 | 6/4/93 | 3,000.0 | 23.0 |
| F-138 | 5/26/93 | 6/30/93 | 3,000.0 | 0.1 |
| F-140 | 5/27/93 | 6/9/93 | 2,700.0 | 23.0 |
| F-141 | 5/27/93 | 6/24/93 | 3,000.0 | 77.0 |
| F-142 | 5/28/93 | 6/24/93 | 3,000.0 | 99.0 |
| F-143 | 5/28/93 | 6/7/93 | 2,700.0 | 10.0 |
| F-144 | 5/28/93 | 6/9/93 | 3,000.0 | 80.0 |
| F-146 | 6/1/93 | 6/9/93 | 2,600.0 | 15.0 |
| F-147 | 6/8/93 | 6/16/93 | 300.0 | 18.0 |
| F-148 | 6/9/93 | 6/17/93 | 413.0 | 13.0 |
| F-149 | 6/9/93 | 6/17/93 | 520.0 | 5.0 |
| F-150 | 6/9/93 | 6/17/93 | 520.0 | 15.0 |
| F-151 | 6/9/93 | 6/18/93 | 413.0 | 8.0 |
| F-152 | 6/9/93 | 6/18/93 | 413.0 | 8.0 |
| F-153 | 6/11/93 | 6/18/93 | 2,700.0 | 85.0 |
| F-154 | 6/11/93 | 6/25/93 | 413.0 | 5.0 |
| F-155 | 6/17/93 | 6/25/93 | 413.0 | 57.0 |
| F-156 | 6/18/93 | 6/25/93 | 520.0 | 13.0 |
| F-157 | 6/18/93 | 6/26/93 | 520.0 | 10.0 |
| F-158 | 6/18/93 | 6/26/93 | 520.0 | 10.0 |
| F-160 | 6/22/93 | 6/26/93 | 520.0 | 7.0 |
| F-164 | 6/25/93 | 6/30/93 | 300.0 | <.1 |
| F-165 | 6/25/93 | 6/30/93 | 300.0 | <.1 |
| F-167 | 6/28/93 | 6/30/93 | 300.0 | <.1 |

EXAMPLE 2

The procedure was similar to that of Example 1, except it was performed during the winter. 15 cubic yards of clayey, rocky soil with TPH of 48,900 was placed in a box in February 1994, and the following components were added:

1 gal Supracid 1 gal RDG 4500 plus 2 lb RDG 100

1 qt Biolates 20-2-2

1 qt PolyExtend On days 2, 5, 8, and 13, the box was wanded. On day 5, 1 gal sulfuric acid was added. On day 8, one pound RDG 100 was added, and on day 13, 1 lb microbes and 1 qt nutrients were added. The product was analyzed on day 13 by modified EPA Method 8015, yielding TPH of 35 mg/kg. The cost of treatment was significantly less than the alternative of disposing of the soil as a hazardous waste.

EXAMPLE 3

14 cubic yards of clayey, rocky soil with TPH of 48,900 was placed in a box in February 1994. On day 2, the following components were added:

1 gal Supracid 1 gal RDG 4500 plus 2 lb RDG 100

1 qt Biolates 20-2-2

1 qt PolyExtend On days 3, 6, 10, and 15, the box was wanded. On day 6, 1 gal sulfuric acid was added. On day 8, one pound RDG 100 was added. The product was analyzed on day 14 yielding TPH of 65 mg/kg.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A biological treatment apparatus comprising:

(a) a vessel containing contaminated material and water in proportions that produce a saturated solid phase with an overlying water column;

(b) an aeration system, comprising an air pump, an aerator, and a controller, the aeration system injecting air into the water column at a rate sufficient to maintain the dissolved oxygen level at about the biological oxygen demand without agitation that would produce unacceptable levels of air emissions;

(c) contaminant-digesting microbes with supporting materials to sustain growth of a microbial bloom in the water column; and (d) a wand inductor system comprising a liquid intake in the water column, a liquid pump producing about 85 to about 130 psi, a discharge hose, and a wand inductor outlet with a zone of influence capable of being directed throughout the entire volume of the vessel, such that repeated periodic operation of the wand inductor system produces a slurry of contaminated material, water, oxygen, and microbes, and non-operation allows the slurry to return to a saturated solids phase with overlying water column, until essentially all contamination in the vessel is digested by the microbes.

2. An apparatus according to claim 1, wherein the vessel is a 20 cubic yard roll off box.

3. An apparatus according to claim 1, wherein the outlet is a pipe.

4. An apparatus according to claim 1, wherein the intake has a screen and the outlet is a pipe with diameter slightly greater than the mesh size of the screen.

5. An apparatus according to claim 1, wherein the intake has a screen of about 3/8 inch mesh and the outlet is a pipe with diameter about 1/2 inch.

6. An apparatus according to claim 1, wherein the outlet pressure is from about 85 to about 130 PSI.

7. An apparatus according to claim 1, wherein the outlet pressure is from about 95 to about 120 PSI.

8. An apparatus according to claim 1, wherein the outlet pressure is about 100 PSI.

9. An apparatus according to claim 1, wherein the zone of influence of the outlet is about 6 inches out and about 24 inches down.

10. An apparatus for remediation of contaminated materials according to claim 1, wherein surfactants are present at concentrations of about 8 to 64 ounces per 15 cubic yards.

11. A method of removing contamination from contaminated material, comprising:

(a) placing the contaminated material into a vessel;

(b) providing water to cover the contaminated material and produce a saturated solid phase with an overlying water column;

(c) injecting air into the water column to maintain the dissolved oxygen level at about the biological oxygen demand;

(d) periodically pumping liquid from the water column and discharging the liquid into the solid phase through a wand inductor outlet under pressure, directing the discharge around the vessel to contact essentially the entire volume of material and produce a slurry, and allowing the slurry to separate; and (e) repeating the pumping step and controlling conditions until essentially no contamination remains in the vessel.

12. A method of removing contamination according to claim 11, in which the discharge has a pressure great enough to shear particles bound together and washes debris within the vessel.

13. A method of removing contamination according to claim 11, in which the wand inductor outlet is a half inch pipe with a zone of influence of about 6 inches at about 24 inches past the mouth of the pipe.

14. A method of removing contamination according to claim 11, wherein the pumping is carried out at a time when a microbial bloom is at about a relative maximum and the contaminant concentration of the water column is at about a relative minimum.

15. A method of removing contamination according to claim 11, wherein the discharge shears clay particles and cleans particles from debris.

16. A method of removing contamination according to claim 11, wherein the pumping takes place about every 2 or 3 days.

17. A method of removing contamination according to claim 11, wherein a roughly neutral pH is maintained.

18. A method of removing contamination according to claim 11, wherein dissolved oxygen is maintained in a range between about 6 and about 8 ppm.

19. A method of removing contamination according to claim 11, wherein the vessel is a 20 cubic yard roll-off container.

20. A method of removing contamination according to claim 11, in which microbes and support products are added.

21. A method of removing contamination according to claim 11, further comprising the steps of solubilizing metals from the contaminated media and removing the solubilized metals from the vessel.

22. A method of removing contamination according to claim 11, in which the step of injecting air into the water column comprises opening and closing valves in a pattern and duration sufficient to maintain the desired oxygen level without agitation that would produce unacceptable levels of air emissions.

23. A method of removing contamination according to claim 20, in which nutrients are added.

24. A method of removing contamination according to claim 11, wherein the container is a roll off box.

25. A method of removing contamination according to claim 11, wherein the outlet is a pipe.

26. A method of removing contamination according to claim 25, wherein the pumping from the water column is done through an intake having a screen, and the outlet pipe has a diameter slightly greater than the mesh size of the screen.

27. A method of removing contamination according to claim 26, wherein the intake has a screen of about ⅜ inch mesh and the outlet is a pipe with diameter about ½ inch.

28. A method of removing contamination according to claim 11, wherein the outlet pressure is from about 85 to about 130 PSI.

29. A method of removing contamination according to claim 11, wherein the outlet pressure is from about 95 to about 120 PSI.

30. A method of removing contamination according to claim 11, wherein the outlet pressure is about 100 PSI.

31. A method of removing contamination according to claim 11, wherein the zone of influence of the outlet is about 6 inches out and about 24 inches down.

32. A method of removing contamination according to claim 11, wherein surfactants are present at concentrations of about 8 to 64 ounces per 15 cubic yards of contaminated material.

* * * * *